US005497310A

United States Patent [19]

Noda et al.

[11] Patent Number: 5,497,310

[45] Date of Patent: Mar. 5, 1996

[54] HIGH-FREQUENCY POWER UNIT FOR NEON TUBES

[75] Inventors: Makoto Noda, Ibi; Fumio Ichimiya; Ryoichi Uda, both of Gifu, all of Japan

[73] Assignee: Kabushiki Kaisha Sanyo Denki Seisakusho, Gifu, Japan

[21] Appl. No.: 143,740

[22] Filed: Nov. 1, 1993

[30] Foreign Application Priority Data

| | | | |
|---|---|---|---|
| Nov. 6, 1992 | [JP] | Japan | 4-297245 |
| Nov. 6, 1992 | [JP] | Japan | 4-297246 |
| Dec. 18, 1992 | [JP] | Japan | 4-338797 |

[51] Int. Cl.$^{6}$ .......... H02M 5/45

[52] U.S. Cl. .......... 363/17; 363/98; 363/132; 323/250; 315/DIG. 7

[58] Field of Search .......... 363/17, 98, 131, 363/132, 136; 323/249, 250; 315/DIG. 7

[56] References Cited

U.S. PATENT DOCUMENTS

| | | | |
|---|---|---|---|
| 3,739,255 | 6/1973 | Leppert | 363/75 |
| 4,002,875 | 1/1977 | Kiuchi et al. | 363/37 |
| 4,130,790 | 12/1978 | Heisey | 323/60 |
| 4,414,491 | 11/1983 | Elliott | 315/282 |
| 4,508,996 | 4/1985 | Clegg et al. | 315/224 |
| 4,583,156 | 4/1986 | Forge | 363/17 |
| 4,727,470 | 2/1988 | Nilssen | 363/132 |
| 5,099,407 | 3/1992 | Thorne | 363/37 |

FOREIGN PATENT DOCUMENTS

| | | |
|---|---|---|
| 7413718 | 11/1974 | France . |
| 3917850 | 12/1989 | Germany . |

OTHER PUBLICATIONS

"Ferroresonant Regulator Design", by H. B. Farensbach, IEEE Trans. on Magnetics, vol. 1, No. 1, Mar. 1970, p. 9.

*Primary Examiner*—Peter S. Wong
*Assistant Examiner*—Adolph Berhane
*Attorney, Agent, or Firm*—Pollock, Vande Sande & Priddy

[57] ABSTRACT

DC power is converted by an inverter to high-frequency power, which is supplied to the primary winding of a neon transformer. One or more neon tubes are connected in series across the secondary winding of the neon transformer. A saturable reactor is connected across the secondary winding or the neon transformer. The saturable reactor has a characteristic that its magnetic flux is saturated when the output voltage from the secondary winding of the neon transformer increases 1.1 to 2.0 times the rated voltage.

4 Claims, 12 Drawing Sheets

HIGH-FREQUENCY POWER UNIT FOR NEON TUBES

BACKGROUND OF THE INVENTION

The present invention relates to a power unit for neon sign and particularly to a high-frequency power unit which boosts high-frequency power by a transformer to light neon or argon tubes connected to the secondary side thereof.

Conventionally, the commercial line power is boosted prior to its application to neon or argon tubes to light them, but this method necessitates the use of a large or bulky boosting transformer. In view of this, it has been proposed to utilize high-frequency power of, say, 20 or 30 kHz for lighting neon or argon tubes (hereinafter referred to simply as neon tubes) so as to permit the use of a small boosting transformer.

The power unit of this kind, which utilizes such high-frequency power, is usually capable of lighting neon tubes even if the number of tubes connected to the boosting transformer is in excess of a predetermined value. When a user inadvertently or recklessly connects neon tubes more than specified, the boosting transformer is subjected to abuse or forced to operate under severe conditions, causing sudden current and voltage increases and often resulting in a run-away of the transformer.

In the case where a plurality of neon tubes are connected in series to the transformer, if any one of the tubes is broken or falls off, the secondary side of the transformer becomes open. When all the neon tubes are being lighted, a resistance load is imposed on the transformer, but when the secondary side is open, the stray capacitance between the transformer and the ground is applied as a load to the former because high-frequency power is fed thereto. In this situation, a leading current flows in the boosting transformer and its voltage increases; for instance, voltage at the output side of the secondary winding becomes about twice higher than the voltage level during normal operation. A higher voltage appears particularly when the transformer is in the resonance state. This may sometimes give rise to the destruction of insulation of the transformer or damage to an inverter for obtaining the high-frequency power.

In FIG. 1 there are shown a conventional high-frequency power unit for neon tubes and a plurality of neon tubes connected in series between its output terminals 18 and 19. Commercial AC power from a commercial AC power source 5 is converted by a rectifier 10 in a high-frequency power circuit 100 to DC power, which is fed to an inverter 20. The inverter 20 converts the DC power to high-frequency power, which is applied across terminals 2 and 3 of a primary winding Wp of a neon transformer 17. A plurality of neon tubes 4 are connected in series between the output terminals 18 and 19 of a secondary winding Ws of the transformer 17. An equivalent circuit of this circuit connection is such as depicted in FIG. 2A, in which an inductance $L_T$ and an internal resistance r of the neon transformer 17 are connected in series between the terminals 2 and 18, the terminals 3 and 19 being directly connected to each other. The inductance $L_T$ is the sum of a leakage inductance M between the primary and secondary windings Wp and Ws and a self-inductance Ls of the secondary winding Ws. Between the terminals 18 and 19 there is connected a parallel circuit composed of a leakage inductance Lx, a winding stray capacitance $C_{NS}$ of the transformer 17 and a leakage resistance Rx. Since the neon tubes 4 are regarded as resistors during discharge, a resistor $R_L$ is connected as a load $R_L$ between the terminals 18 and 19, a capacitance $C_{LL}$ is connected between the neon tubes 4 in parallel to the load $R_L$, and the capacitance $C_{LG}$ between each of the neon tubes 4 and the ground is present between each of the terminals 18 and 19 and the ground. Moreover, the capacitance $C_T$ between the core of the transformer 17 and each winding is expressed as the capacitance $C_T'$ between the high-frequency voltage source 100' and the ground. Letting the high-frequency output voltage of the high-frequency power circuit 100 in FIG. 1 be represented by $V_{AC}$ and the numbers of turns of the primary and secondary windings Wp and Ws by $n_p$ and $n_s$, respectively, a voltage $Vs=V_{AC}\, n_s/n_p$ is applied across the terminals 18 and 19. Therefore, in FIG. 2A the equivalent high-frequency voltage source for the boosted high-frequency voltage Vs is identified by 100'.

Adding up the respective capacitance components, the equivalent circuit of FIG. 2A can be represented as shown in FIG. 2B. The series connection of the resistance r and the inductance $L_T$ is connected at one end to the terminal 2, and the capacitance $C_{LL}$ and the resistance $R_L$ are connected in parallel between the other end of the above-mentioned series connection and the terminal 3. The leakage inductance Lx and the leakage resistance Rx are usually large and currents therein are negligibly small. While the neon tubes 4 are being normally lighted, the resistance $R_L$ is very small; hence, as shown in FIG. 2C, a current I flowing across the inductance $L_T$ is substantially in-phase with a voltage Vo that is developed across the load, a voltage $V_{LT}$ that is developed across the inductance $L_T$ leads the current I by a phase angle of around 90°, and a voltage Vr that is developed across the resistor r is substantially in-phase with the current I. The vector sum of the voltages Vo, $V_{LT}$ and Vr is the voltage Vs; therefore, Vs>Vo.

In the event that one of the neon tubes 4 is broken or cracked, that is, when the terminals 18 and 19 are disconnected from each other, a capacitance C', which is the sum of the capacitance $C_{LL}$ between the neon tubes 4 and the capacitance $C_{LG}$ between each neon tube and the ground, is imposed as a load on the transformer. Since the capacitance C' is relatively large when the number of neon tubes 4 is large, and since the high-frequency voltage Vs is applied, the impedance of the capacitance C' is relatively small. Hence, as shown in FIG. 2D, the current I flowing through the inductance $L_T$ leads the load voltage $V_0$ by a phase angle of about 90°, the voltage $V_{LT}$ which is developed across the inductance $L_T$ leads the current I by a phase angle of about 90°, and the voltage which is developed across the resistor r is in phase with the current. The vector sum of the voltage Vr, $V_{LT}$ and $V_O$ is the applied voltage Vs, and the voltage Vr becomes abnormally higher than the voltage Vs, the transformer entering the overvoltage stage.

To prevent this, it is a general practice in the prior art to cut off the current in the primary side of the neon transformer upon detection of flowing of an overcurrent in the primary winding by a detector, or upon detection of a discharge or spark that is generated across a discharge or spark gap formed in a part of the secondary winding when an overvoltage is developed thereacross.

In the conventional neon tube lighting high-frequency power unit, the current in the primary side is cut off after detection of the overcurrent or overvoltage state of the transformer as mentioned above; however, this does not provide sufficient protection of the power unit because an electric breakdown of the secondary winding or breakdown of the inverter for applying the high-frequency power to the transformer is already caused by the overcurrent or overvoltage when the current cutoff takes place.

In a display of the type employing high-frequency driven neon tubes, though dependent on their diameters or gas pressures, stripe patterns commonly referred to as "jelly beans" may sometimes appear on the neon tubes lengthwise thereof during their ON state. With the prior art, it is impossible to prevent the jelly beans from occurrence.

In FIG. 3 there is shown a prior art example of a small capacity half-bridge inverter, indicated generally by 20, that is used in the neon tube lighting high-frequency power unit 100 of FIG. 1. A full-wave rectifier 15 is connected via a switch 14 across the AC power input terminals 11 and 12. A series circuit of capacitors C1 and C2 and a series circuit of switching elements SW1 and SW2, formed by FETs, are connected via a delay switch circuit DSW across the output of the rectifier 15. The primary winding Wp of the neon transformer 17 is connected between the connection point of the capacitors C1 and C2 and the connection point of the switching elements SW1 and SW2. Moreover, a smoothing circuit, which is formed by a parallel connection of a capacitor 16C and a resistor 16R, is connected between the output terminals of the fullwave rectifier 15.

The smoothing circuit 16 is connected at its positive side via a resistor 21 to a power terminal of a switching regulator 22 for generating a high-frequency switching signal, the negative side of the smoothing circuit 16 being connected to a grounding terminal of the switching regulator 22. The switching regulator 22 is a commercially available integrated circuit. A capacitor 23 and a Zener diode 24 are connected in parallel between the power terminal and the grounding terminal of the switching regulator 22. A switching control signal output of the switching regulator 22 is connected via a capacitor 25 to a primary side 26P of a pulse transformer 26. Secondary windings 26S1 and 26S2 of the pulse transformer 26 have their both ends connected to gates and source of the FETs that form the switching elements SW1 and SW2, respectively.

When AC power is supplied to the rectifier 15, the resulting direct current begins to charge the capacitor 23 via the resistor 21, and when the voltage of the capacitor 23 exceeds a certain value, the switching regulator 22 starts its oscillation. After this, the power terminal of the switching regulator 22 is held at a voltage that is determined by the Zener diode 24, relative to the ground. The switching regulator 22 generates a rectangular high-frequency signal and applies it via the capacitor 25 to the primary winding 26P of the pulse transformer 26. A time constant that is dependent on the values of a resistor 20R and a capacitor 20C in the delay switching circuit DSW is chosen such that the smoothing circuit 16 starts a DC supply and then a transistor switch TSW of the delay switching circuit DSW is turned ON at a timing ten-odd cycles after the start of oscillation of the switching regulator 22.

The input rectangular signal to the primary winding 26P of the pulse transformer 26 is applied intact to the gate of the switching element SW1 from the one secondary winding 26S1 and in the inverted polarity to the gate of the switching element SW2 from the other secondary winding 26S2. Accordingly, the switching element SW1 is turned ON at the rise of the output rectangular wave from the switching regulator 22, whereas the switching element SW2 is turned ON at the fall of the rectangular wave. By turning ON the switching elements SW1 and SW2 alternately with each other, the capacitors C1 and C2 alternately discharge through the neon transformer 17, outputting therefrom high-frequency power. Incidentally, the neon transformer 17 has a tertiary winding Wt. Upon initiation of supplying the high-frequency power to the primary winding Wp of the neon transformer 17 through the alternate ON-OFF operation of the switching elements SW1 and SW2, the AC output from the tertiary winding Wt is provided via a diode 29D to the switching regulator 22, thus starting power supply thereto from the transformer 17.

In this-prior art inverter 20, however, the pulse transformer 26 may sometimes gets saturated at the start of operation, with the result that the amplitude of its drive signal output is unstable for several cycles at the start of operation. To prevent this, the delay switching circuit DSW is provided so that no current is supplied to the switching elements SW1 and SW2 for a period of ten-odd cycles after the start of operation of the inverter 20, that is, no current supply to them takes place before the oscillation of the switching regulator 22 becomes stable. In this instance, however, the delay switching circuit is inevitably bulky and expensive because the transistor switch TSW needs to control a relatively large current.

SUMMARY OF THE INVENTION

It is therefore an object of the present invention to provide a neon tube lighting high-frequency power unit which precludes the possibility of current runaway in the neon transformer even if the number of neon tubes connected thereto is larger than a specified number or which precludes the possibility of overvoltage in the transformer even if its secondary side is opened when any one of the neon tubes breaks.

Another object of the present invention is to provide a neon tube lighting high-frequency power unit which eliminates the possibility of stripe patterns appearing on the neon tubes lengthwise thereof.

Still another object of the present invention is to provide a neon tube lighting high-frequency power unit which is capable of stable operation no matter when the inverter is started after the power supply is connected to the main circuit.

According to a first aspect of the present invention, a saturable reactor is connected in parallel to the output side of the neon transformer that is supplied with the high-frequency power, so as to prevent an abnormal increase in the voltage of the load circuit.

Alternatively, a leakage magnetic path is provided between the primary and secondary windings of the neon transformer, and the magnetic path at the secondary winding side is saturated when the voltage across the secondary winding exceeds a prescribed value, for example, 1.1 to 2.0 times higher than the rated voltage. That is, the magnetic saturation of the magnetic path at the secondary winding side through the leakage magnetic path performs the function of the above-mentioned saturable reactor.

Alternatively, that portion of the magnetic core of the neon transformer on which the primary winding is wound is adapted to be more difficult of magnetic saturation than the core portion on which the secondary winding is wound.

According to a second aspect of the present invention, the inverter, which is used to convert DC power to high-frequency square-wave power for supply to the neon transformer, is designed so that the duty ratio of the high-frequency power is off 50%.

According to a third aspect of the present invention, a voltage dividing resistor is connected between positive and negative terminals of the switching regulator and the voltage dividing point is connected to that side of the capacitor inserted between the switching regulator and the pulse transformer which is opposite from the latter, that is near the former. With such an arrangement, when the voltage supply to the switching regulator starts, the capacitor is also charged via the voltage divider at the same time; hence, when the switching regulator starts its normal operation, the charging current no longer flows in the capacitor, ensuring stable operation of the switching regulator.

DESCRIPTION OF THE PREFERRED EMBODIMENTS

Figure 4A:
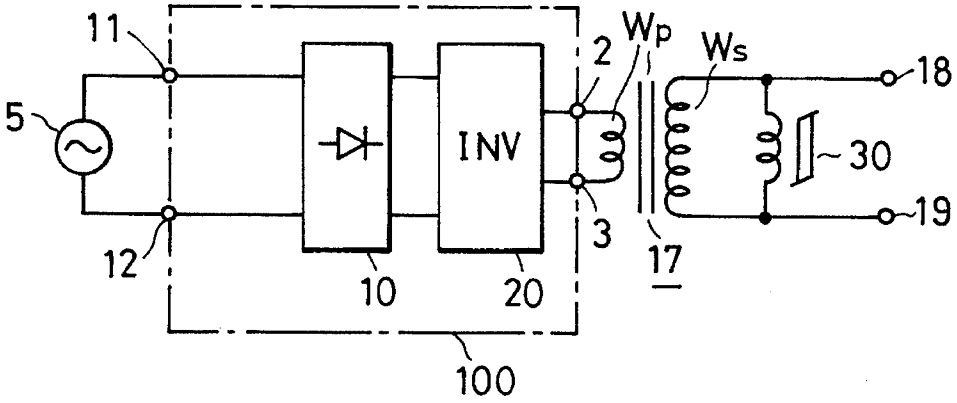
FIG. 4A is a block diagram illustrating an embodiment of the neon tube lighting high-frequency power unit according to the first aspect of the present invention.
Figure 4B:
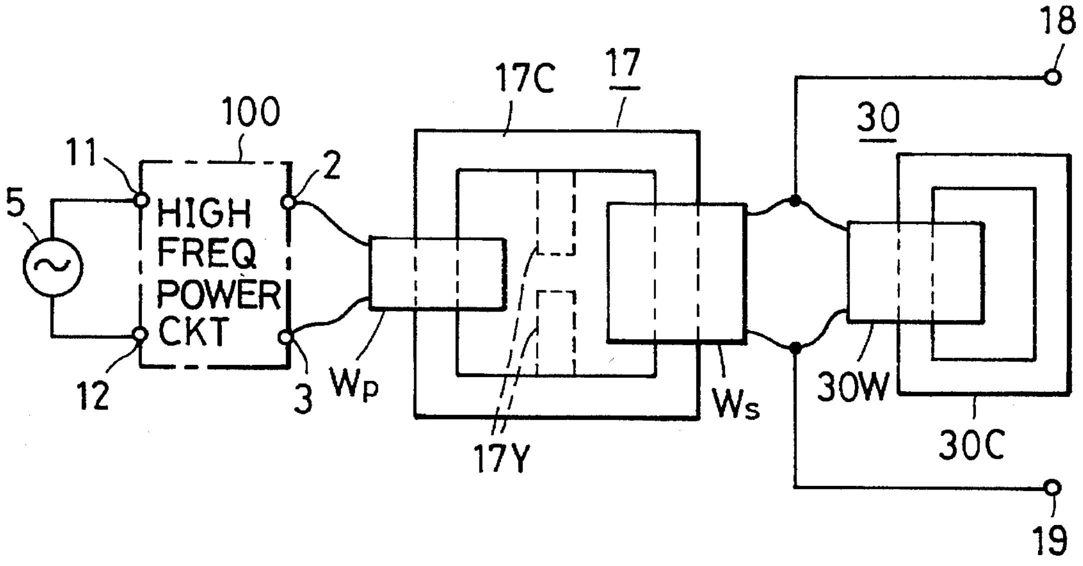
FIG. 4B is a diagram schematically showing examples of the neon transformer and a saturable reactor in the embodiment of FIG. 4A.

FIGS. 4A and 4B illustrate an embodiment of the neon tube lighting high-frequency power unit according to the first aspect of the present invention. The high-frequency power from the high-frequency power circuit 100 is applied across the primary winding Wp of the transformer 17 via its terminals 2 and 3. In this example, a low-frequency AC power source 5 such as the commercial line is connected to the AC power input terminals 11 and 12, through which low-frequency AC power is fed to the high-frequency power circuit 100. The low-frequency AC power is rectified by the rectifier 10 into DC power, which is then converted by the inverter 20 into high-frequency power of 20 or 30 kHz, for instance. The high-frequency power thus obtained is provided across the primary winding Wp of the transformer 17. Between the terminals 18 and 19 of the secondary winding Ws of the transformer 17 one or more neon tubes (not shown) are connected in series so that they are energized or lighted through discharge.

According to the first aspect of the present invention, a saturable reactor 30 is connected to the output circuit of the secondary winding Ws, that is, between its both ends. The saturation voltage of the saturable reactor 30 is set in the range of 1.1 to 2.0 times higher than the rated voltage of the high-frequency power unit at the secondary winding side, for example, about 1.2 times higher than the rated voltage. As shown in FIG. 4B, the transformer 17 has its primary and secondary windings Wp and Ws wound on opposed sides of a rectangular magnetic core (an iron core) 17C, respectively, and the saturable reactor 30 is formed by a winding 30W wound on one side of a rectangular magnetic core 30C, both ends of the winding 30W being connected to the both ends of the secondary winding Ws.

With such an arrangement, even if the voltage across the secondary winding Ws of the transformer 17 rapidly increases as if it exceeds the rated voltage when neon tubes of a number greater than the specified number are connected between the terminals 18 and 19, the saturable reactor 30 will become magnetically saturated at a level slightly above the rated voltage. That is, the voltage across the secondary winding Ws is held below a constant voltage value of the saturable reactor 30 by virtue of its constant voltage characteristic; thus, the increase in either current or voltage is suppressed. Hence, if neon tubes more than the rated number are connected to the transformer 17, they will not be supplied with voltage high enough to energize them; that is, no neon tubes will be lighted. Accordingly, there is no fear of a runaway of the transformer 17.

In the event that any one of neon tubes being lighted is broken or the circuit is cut off and the terminals 18 and 19 are disconnected accordingly, a leading current flows through the stray capacitance and the voltage at the output side of the transformer 17 rapidly increases as mentioned above, but the generation of an abnormally excessive voltage is prevented by virtue of the constant voltage characteristic of the saturable reactor 30. That is, since the saturable reactor has a large number of turns and draws a current of its inductance component, the leading current, which is generated when the terminals 18 and 19 are disconnected, is cancelled by a lagging current flowing through the saturable reactor 30—this suppresses the generation of an excessive voltage.

Figure 5A:
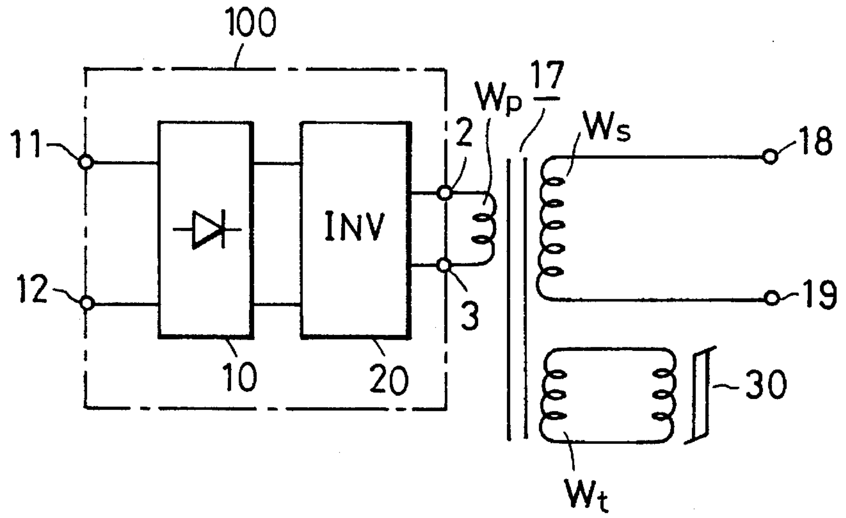
FIG. 5A is a circuit diagram illustrating another embodiment according to the first aspect of the invention.
Figure 5B:
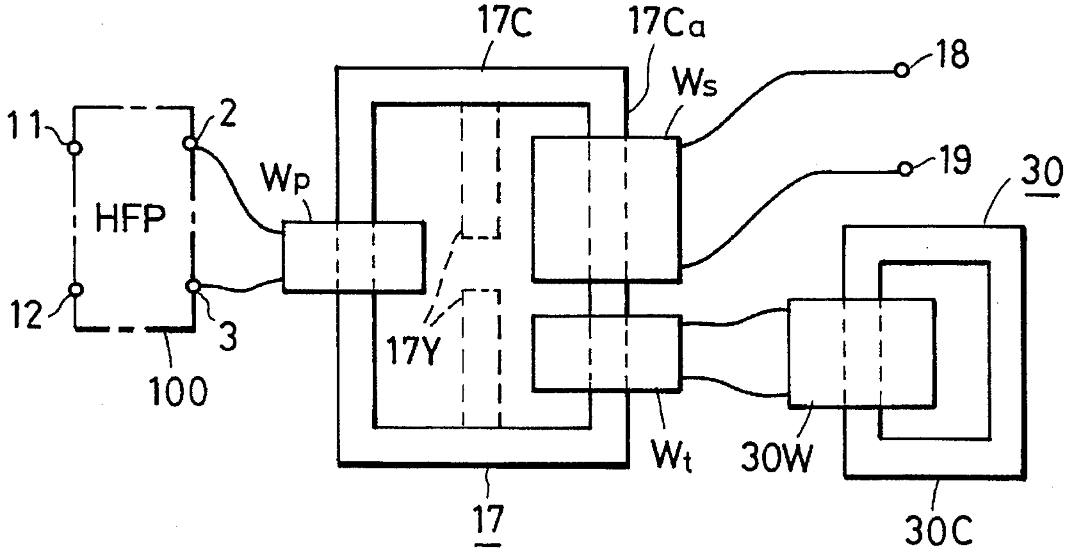
FIG. 5B is a diagram schematically showing examples of the neon transformer and the saturable reactor in another embodiment of FIG. 5A.

In FIGS. 5A and 5B there is illustrated a modified form of the high-frequency power unit according to the first aspect of the present invention in which the parts corresponding to those in FIGS. 4A and 4B are identified by the same reference numerals. This embodiment employs a tertiary winding Wt tightly coupled to the secondary winding Ws of the transformer 17. The saturable reactor 30 is connected across the tertiary winding Wt. That is, the tertiary winding Wt and the secondary winding Ws are wound on the same side 17Ca of the magnetic core 17C in close proximity to each other as depicted in FIG. 5B. The both ends of the winding 30W of the saturable reactor 30 wound on the magnetic core 30C are connected to both ends of the tertiary winding Wt.

In this embodiment, voltage across the tertiary winding Wt can be made smaller than voltage that is developed across the secondary winding Ws. This permits the use of a reactor that is low in insulation and hence is small in size accordingly. Also in this case, when the voltage across the secondary winding Ws abnormally increases to the verge of becoming 1.1 to 2.0 times higher than the rated voltage, for instance, the saturable reactor 30 connected across the tertiary winding Wt becomes saturated, that is, enters the constant voltage state, with the result that the voltage across the secondary winding Ws will not exceed its prescribed value.

In the above-described two embodiments, since the sum $L_T$ of the leakage inductance M of the primary and secondary windings Wp and Ws and the self-inductance Ls of the secondary winding Ws is relatively large and since the high-frequency power is applied to the transformer 17, the impedance component of the inductance $L_T$ is relatively large. Hence, current in each neon tube can be limited by the inductance $L_T$ in response to a voltage drop between the terminals 18 and 19 when the neon tube is lighted. When the inductance $L_T$ is not sufficiently large, however, the leakage inductance M may also be made large by additionally providing leakage magnetic cores 17Y on the magnetic core 17C as indicated by the broken lines in FIGS. 4B and 5B, as in the case of a low-frequency neon transformer.

Figure 6A:
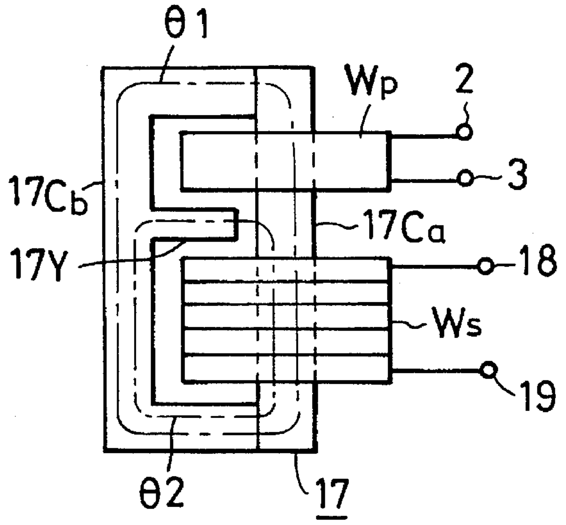
FIG. 6A is a diagram schematically showing an example of the neon transformer implementing the saturable reactor in another embodiment according to the first aspect of the invention.

FIGS. 6A through 8D illustrate only the principal parts of other modified forms wherein the saturable reactor is formed integrally with the neon transformer 17. In FIG. 6A, the primary and secondary windings Wp and Ws of the transformer 17 are wound side by side on the main magnetic core or the so-called main iron core 17Ca. An E-shaped magnetic core (or iron core) 17Cb is connected to both ends of the iron core 17Ca to form a closed magnetic path. A leakage iron core 17Y, which extends from the iron core 17Cb to the vicinity of the main iron core 17Ca, is connected between the primary and secondary windings Wp and Ws. Thus, there are formed a leakage magnetic path 82 wherein a magnetic flux leaks into the leakage iron core 17Y, in addition to a closed magnetic path θ1 formed by the main iron core 17Ca and the E-shaped iron core 17Cb.

In the case where when the voltage across the secondary winding Ws becomes an overvoltage, the current therein becomes excessive accordingly and the magnetic flux density depending on the current in the secondary winding Ws increases, the secondary side magnetic path θ2 are passing through the leakage iron core 17Y and the main iron core 17Ca inside the secondary winding Ws is magnetically saturated, and hence the voltage across the secondary winding Ws will not exceed a predetermined value. That is, in this instance, the coupling between the primary and secondary windings Wp and Ws is made loose by the leakage iron core 17Y, and the secondary windings Ws and the secondary side magnetic path θ2 are used to form a saturable reactor, which is used as the saturable reactor 30 in FIG. 4A. In other words, provision is made for causing the secondary side magnetic path θ2 to be magnetically saturated when the voltage across the secondary winding Ws becomes 1.1 to 2.0 times higher than the rated voltage. To allow the voltage between the terminals 18 and 19 up to a value twice the rated value, it would be necessary that the insulation withstand voltage or dielectric strength of the secondary winding Ws be more than twice the rated voltage. In view of this, the voltage between the terminals 18 and 19 may preferably be limited to the lowest possible voltage above the rated voltage.

Figure 6B:
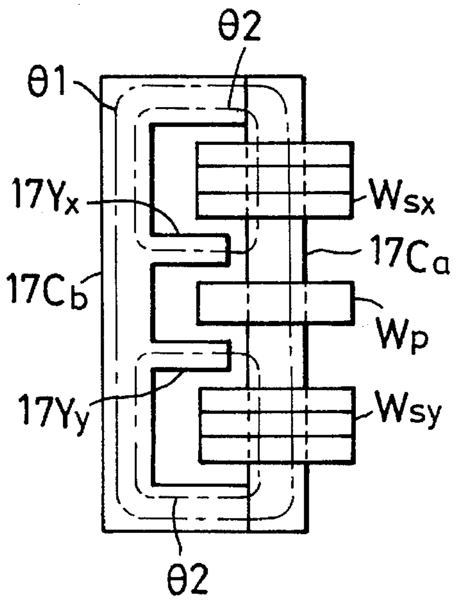
FIG. 6B is a diagram schematically showing another example of the neon transformer implementing the saturable reactor in another embodiment according to the first aspect of the invention.
Figure 6C:
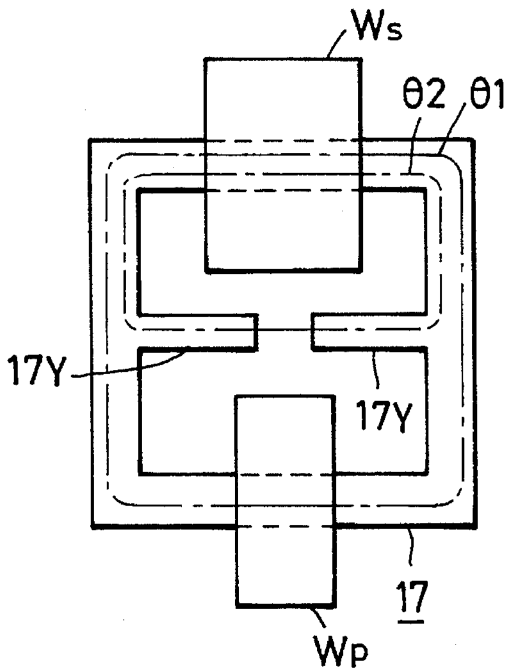
FIG. 6C is a diagram schematically showing another example of the neon transformer implementing the saturable reactor in another embodiment according to the first aspect of the invention.
Figure 6D:
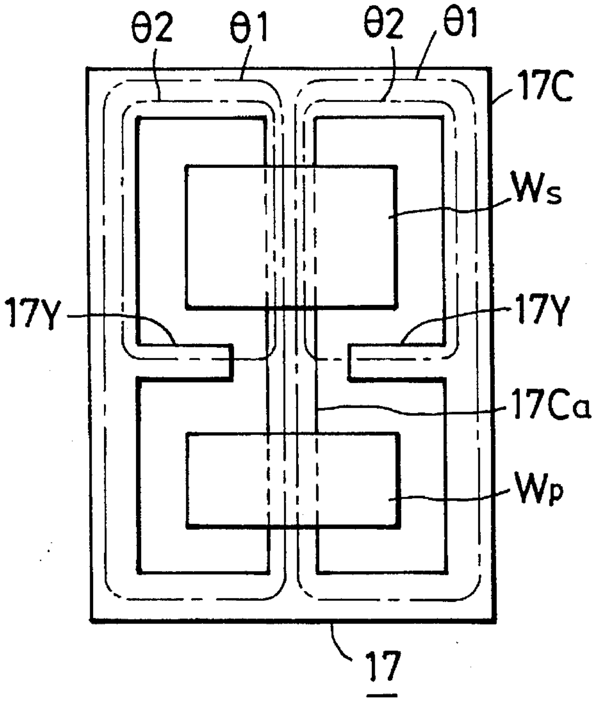
FIG. 6D is a diagram schematically showing another example of the neon transformer implementing the saturable reactor in another embodiment according to the first aspect of the invention.

In FIG. 6B the secondary winding Ws in FIG. 6A is split into two secondary windings Wsx and Wsy that are wound at both sides of the primary winding Wp. This structure is used to ground the tap of the secondary winding Ws, in which case a leakage iron core 17Yx is provided between the primary winding Wp and the secondary winding Wsx and a leakage iron core 17Yy between the primary winding Wp and the secondary winding Wsy. It is also possible to employ such a construction as shown in FIG. 6C, wherein the primary winding Wp and the secondary winding Ws are wound on a pair of opposed sides of the square iron core 17C, respectively, and leakage iron cores 17Y and 17Y may be extended toward each other from the other pair of opposed sides centrally thereof. FIG. 6D shows another modification wherein the primary and secondary windings Wp and Ws are wound side by side on the main iron core 17Ca extending between a pair of opposed sides of the square iron core 17C and the leakage iron cores 17Y and 17Y extended from the other pair of opposed sides and having their tips held adjacent the main iron core 17C between the windings Wp and Ws. In either of the structures of FIGS. 6B and 6C, the principle of forming the saturable reactor is the same as in the case of FIG. 6A.

Figure 7A:
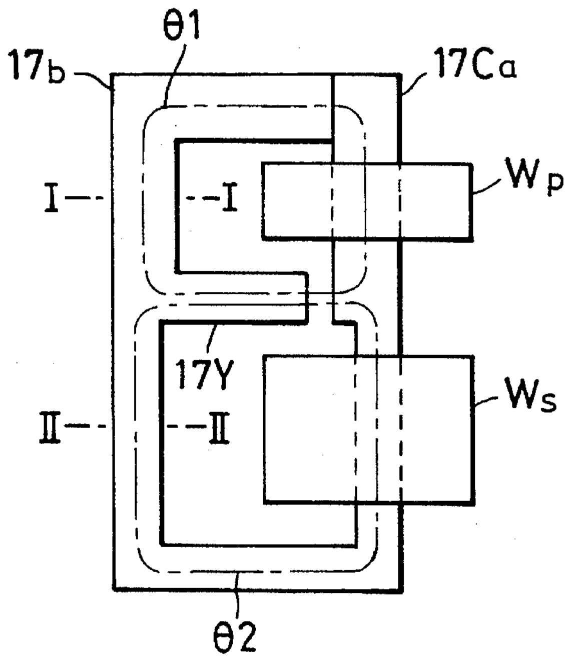
FIG. 7A is a diagram schematically showing another example of the neon transformer implementing the saturable reactor in another embodiment according to the first aspect of the invention.
Figure 7B:
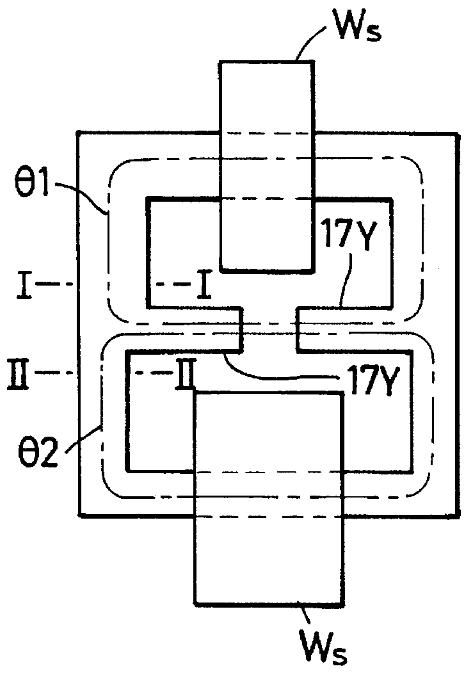
FIG. 7B is a diagram schematically showing another example of the neon transformer implementing the saturable reactor in another embodiment according to the first aspect of the invention.
Figure 7C:
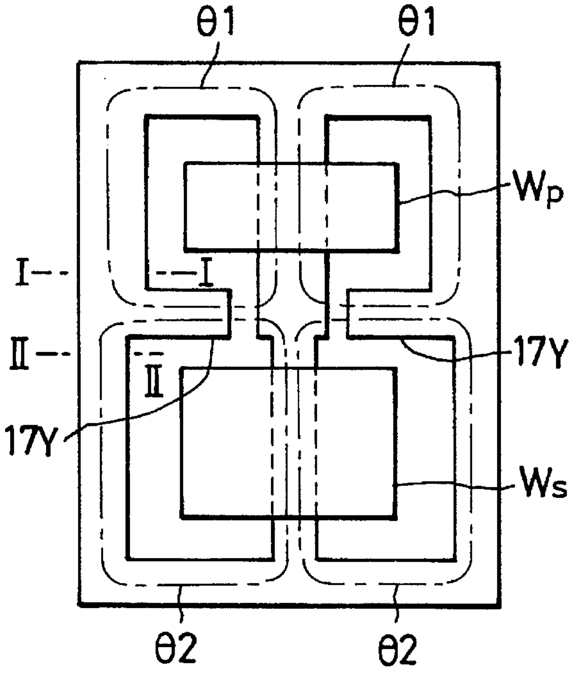
FIG. 7C is a diagram schematically showing another example of the neon transformer implementing the saturable reactor in another embodiment according to the first aspect of the invention.

FIGS. 7A, 7B and 7C illustrates modified forms of the examples shown in FIGS. 6A, 6C and 6D, respectively, the parts corresponding to those in the latter being identified by the same reference numerals. In any of these embodiments, the II—II sectional area of the secondary side magnetic path θ2 wherein the magnetic flux caused by the current flowing in the secondary winding Ws passes through the leakage magnetic iron core 17Y is made smaller than the I—I sectional area of the primary side magnetic path θ1 wherein the magnetic flux caused by the current in the primary winding Wp passes through the leakage iron core 17Y; hence, the secondary side magnetic path θ2 is liable to be magnetically cut off. That is, when the voltage across the secondary winding Ws is on the verge of becoming an excessive voltage in excess of 1.1 to 2.0 times the rated voltage, the secondary side magnetic path θ2 becomes saturated, preventing the generation of such an excessive voltage.

If the secondary side magnetic path θ2 and the primary side magnetic path θ1 are both magnetically saturated, there is a possibility that an overcurrent will flow from the high-frequency power circuit 100 into the primary winding Wp, resulting in the high-frequency power circuit 100 being broken down. This can be prevented, however, by use of such magnetic structures as shown in FIGS. 7A, 7B and 7C wherein the primary side magnetic path θ1 remains unsaturated when the secondary side magnetic path θ2 is saturated.

Figure 8A:
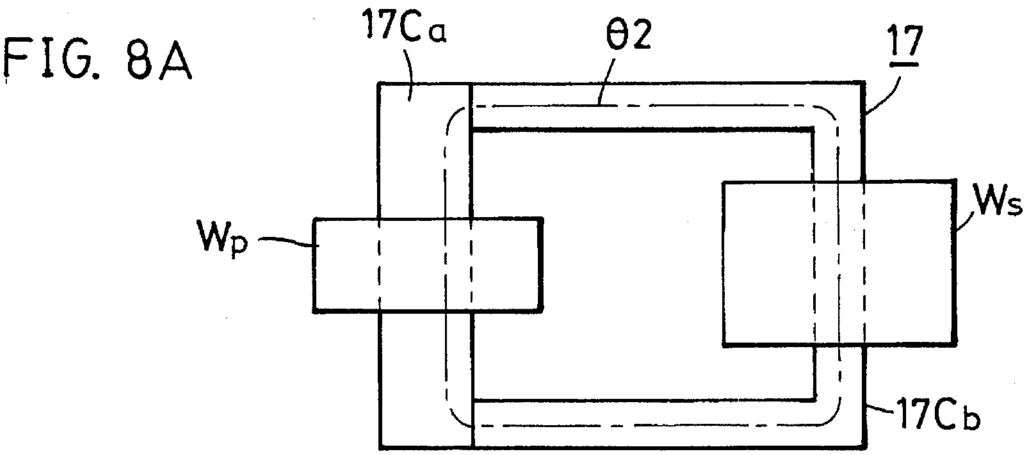
FIG. 8A is a diagram schematically showing another example of each of the neon transformer and the saturable reactor in another embodiment according to the first aspect of the invention.

As described above, in the case of high-frequency lighting, the discharge current can be limited during lighting, by selecting the self-inductance Ls of the secondary winding Ws a little large, and consequently, the leakage iron cores 17Y need not always be provided. With such an arrangement as shown in FIG. 8A wherein the secondary winding Ws is wound on a thin U-shaped magnetic core 17Cb and the primary winding Wp on a thicker I-shaped magnetic core 17Ca, the magnetic cores 17Ca and 17Cb forming a closed magnetic path, there is no need of using the leakage iron cores. Even when the secondary side magnetic path θ2 in the U-shaped magnetic core 17Cb is magnetically saturated, the I-shaped magnetic core 17Ca will not be magnetically saturated and it acts as an I-shaped magnetic core on the primary winding Wp, furnishing it with a proper inductance.

In FIGS. 7A, 7B, 7C and 8A, the difference in cross-sectional area between the secondary side magnetic path θ2 and the primary side magnetic path θ1 needs only to be chosen such that the former is about 1.5 times larger than the latter, for example, when the same material is used for them. The point is to make the secondary side magnetic path θ2 easier of magnetic saturation than the primary side magnetic path θ1; therefore, materials of different saturation magnetic flux densities may also be used for the primary and secondary side magnetic paths, in which case both magnetic paths are equal in cross-sectional area and the material for the secondary side magnetic path needs only to have a saturation magnetic flux density, for example, around 1.1 times higher than that of the material for the primary side magnetic path.

Figure 1:
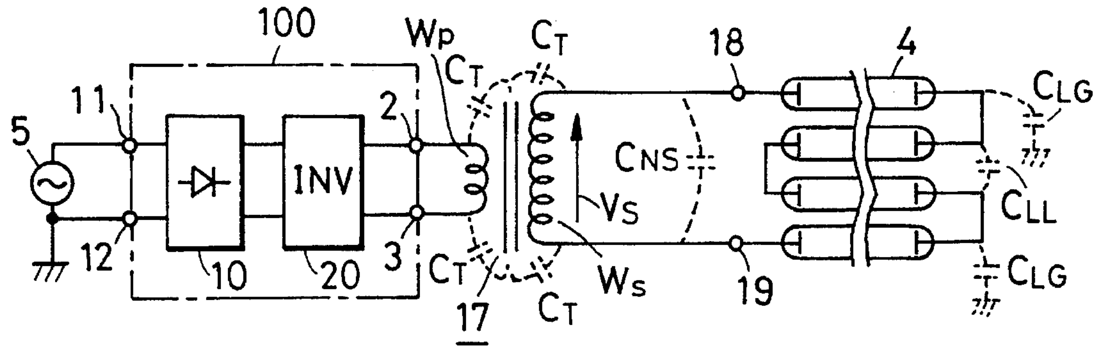
FIG. 1 PRIOR ART
FIG. 1 is a circuit diagram showing a conventional neon tube lighting high-frequency power unit.
Figure 2A:
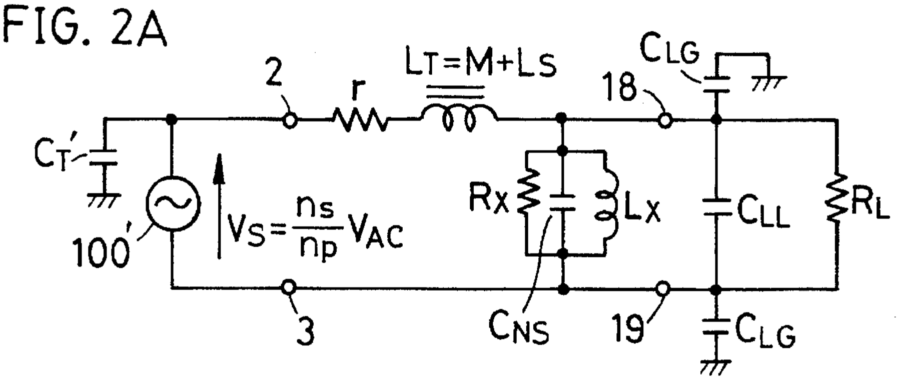
FIG. 2A is an equivalent circuit of the circuit shown in FIG. 1.
Figure 2B:
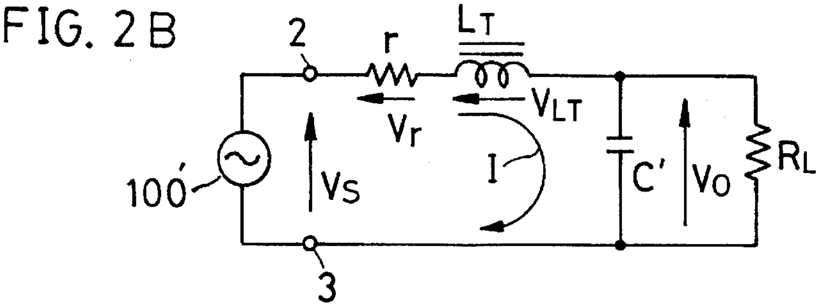
FIG. 2B is a simplified version of the equivalent circuit depicted in FIG. 2A.
Figure 2C:
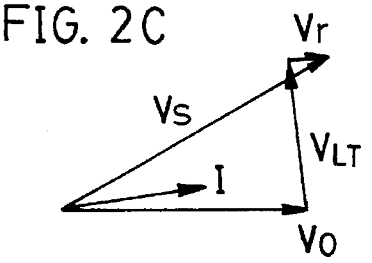
FIG. 2C is a diagram showing voltage vectors during normal operation.
Figure 2D:
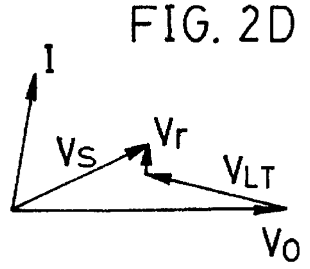
FIG. 2D is a diagram showing voltage vectors when a neon tube is broken.

When the number of neon tubes connected between the terminals 18 and 19 is large or the connecting wire is long, the stray capacitance C' in the equivalent circuit of FIG. 2B becomes so large that an overcurrent may sometimes flow in the event of a disconnection or tube rupture, although an abrupt voltage increase is prevented by the magnetic saturation of the aforementioned saturable reactor 30 or secondary side magnetic path. For example, in the case of argon tubes (which can be connected in a larger number than the neon tubes), if any one of them ruptures, the voltage between the terminals 18 and 19 will abnormally increase as indicated by the broken line in FIG. 9A when the saturable reactor 30 is not provided; but the voltage will be suppressed to a value Vb by the saturable reactor 30. In this case, however, a current Io will have a value $I_1$ appreciably larger than the rated value Is. On this account, there is a possibility of the saturable reactor 30 and the transformer 17 being overheated. Also in the case of suppressing voltage by magnetic saturation of the secondary side magnetic path θ2, there is a possibility of the secondary winding Ws being similarly overheated.

Figure 9A:
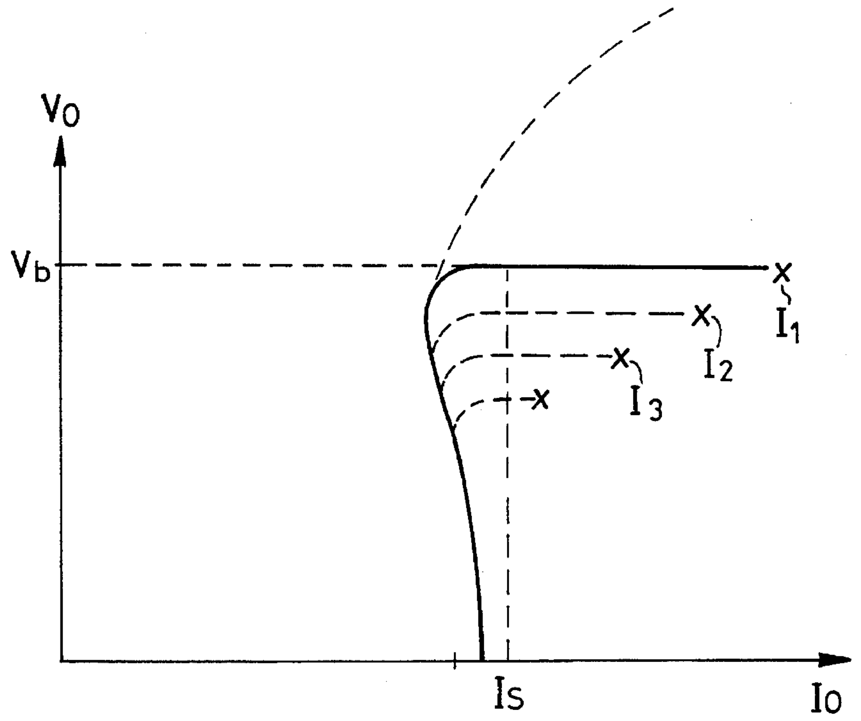
FIG. 9A is a graph showing, by way of example, temperature characteristics of voltage and current between the terminals 18 and 19, for explaining the operation of each embodiment according to the first aspect of the invention.
Figure 9B:
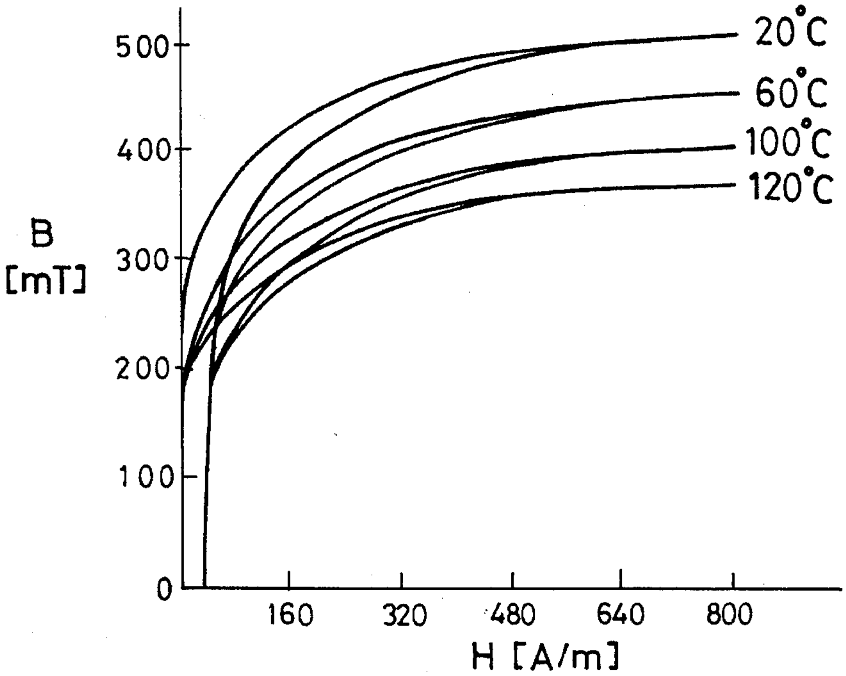
FIG. 9B is a graph showing examples of the temperature characteristic of the B-H curve of a magnetic material used in the embodiment according to the first aspect of the invention.

To avoid this, at least one part of the magnetic core 30C of the saturable reactor 30 or the magnetic core of the transformer 17 forming the secondary side magnetic path θ2 is made of a magnetic material that has a negative temperature coefficient of the saturation magnetic flux density in the B-H characteristic curve. For example, a magnetic material NC-1H has such a B-H temperature characteristic as shown in FIG. 9B, wherein the saturation magnetic flux density decreases as temperature rises. Hence, in the case where the saturable reactor 30 or the secondary side magnetic path θ2 is magnetically saturated due to an abnormal increase in the voltage between the terminals 18 and 19 to limit the voltage increase and the temperature of the saturable reactor 30 or secondary side magnetic path θ2 is raised by an increase in the current flowing therethrough, the saturation magnetic flux density decreases and the suppressed voltage Vb between the terminals 18 and 19 drops accordingly as shown in FIG. 9A, and consequently, the current gradually decreases as indicated by $I_1$, $I_2$, $I_3$, . . . . Accordingly, there is no possibility of the insulation of the winding 30W of the saturable reactor 30 of secondary winding Ws being deteriorated. In addition, until the power supply is turned ON again after turning it OFF and replacing the ruptured tube with a new one, the temperature of the saturable reactor 30 or secondary side magnetic path 2 drops in this period of time and it automatically returns to its initial characteristic.

Figure 8B:
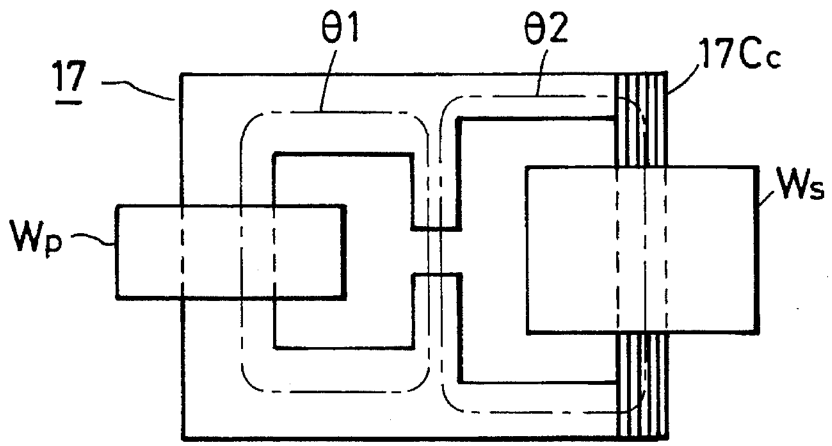
FIG. 8B is a diagram schematically showing another example of the neon transformer implementing the saturable reactor in another embodiment according to the first aspect of the invention.
Figure 8C:
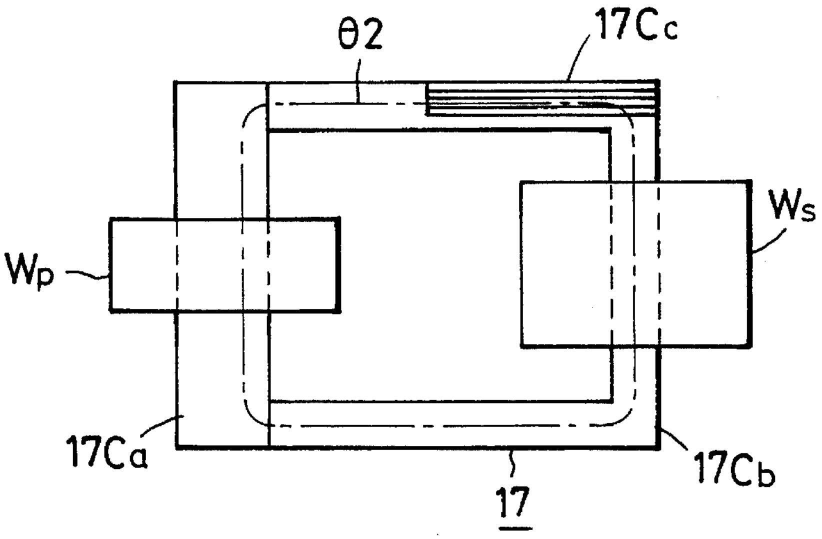
FIG. 8C is a diagram schematically showing still another example of the neon transformer implementing the saturable reactor in still another embodiment according to the first aspect of the invention.

As described previously, the secondary side magnetic path θ2 is adapted to be magnetically saturated when the voltage between the terminals 18 and 19 exceeds a value 1.1 to 2.0 times the rated voltage. The voltage between the terminals 18 and 19 differs in value, for example, 6 kV or 9 kV according to the transformer used. It is possible, therefore, to employ such an arrangement as shown in FIG. 8B, wherein the magnetic core on which the secondary winding Ws is wound is formed by a plurality of control magnetic piece 17Cc and the voltage between the terminals 18 and 19 at which the secondary side magnetic path θ2 is magnetically saturated is controlled by selecting the number of magnetic pieces 17Cc used. This control can be effected anywhere in the secondary side magnetic path θ2; for instance, the portion without the secondary winding Ws may be partly formed by such control magnetic pieces 17Cc as depicted in FIG. 8C. Such control magnetic pieces 17Cc may also be slid onto the transformer from the outside to control the saturation voltage. In this case, the control magnetic pieces 17Cc may preferably be slid widthwise of the transformer. The control magnetic pieces 17Cc can be used regardless of whether the aforementioned leakage iron cores are employed or not.

As described above, according to the first aspect of the present invention, in the case where the output transformer 17 is likely to run away because of connection of too many neon tubes to its secondary side, or where any one of the neon tubes connected to the secondary winding Ws is broken and a leading current flows through the stray capacitance and hence an overvoltage is likely to developed at the secondary side, the overcurrent is suppressed by the reactor component at the secondary winding side—this prevents an insulation breakdown of the secondary winding Ws by the overvoltage. Moreover, it is also possible to prevent the inverter 20 from being overloaded and hence broken by the overvoltage and the overcurrent which would otherwise be developed at the secondary side.

Thus, the first aspect of the present invention is to prevent the generation of an overvoltage and an overcurrent in the transformer 17, not to detect their generation; therefore, the margin of the current rating for the insulation of the transformer and the device can be reduced and the high-frequency-power unit can be made small and low-cost.

Figure 10:
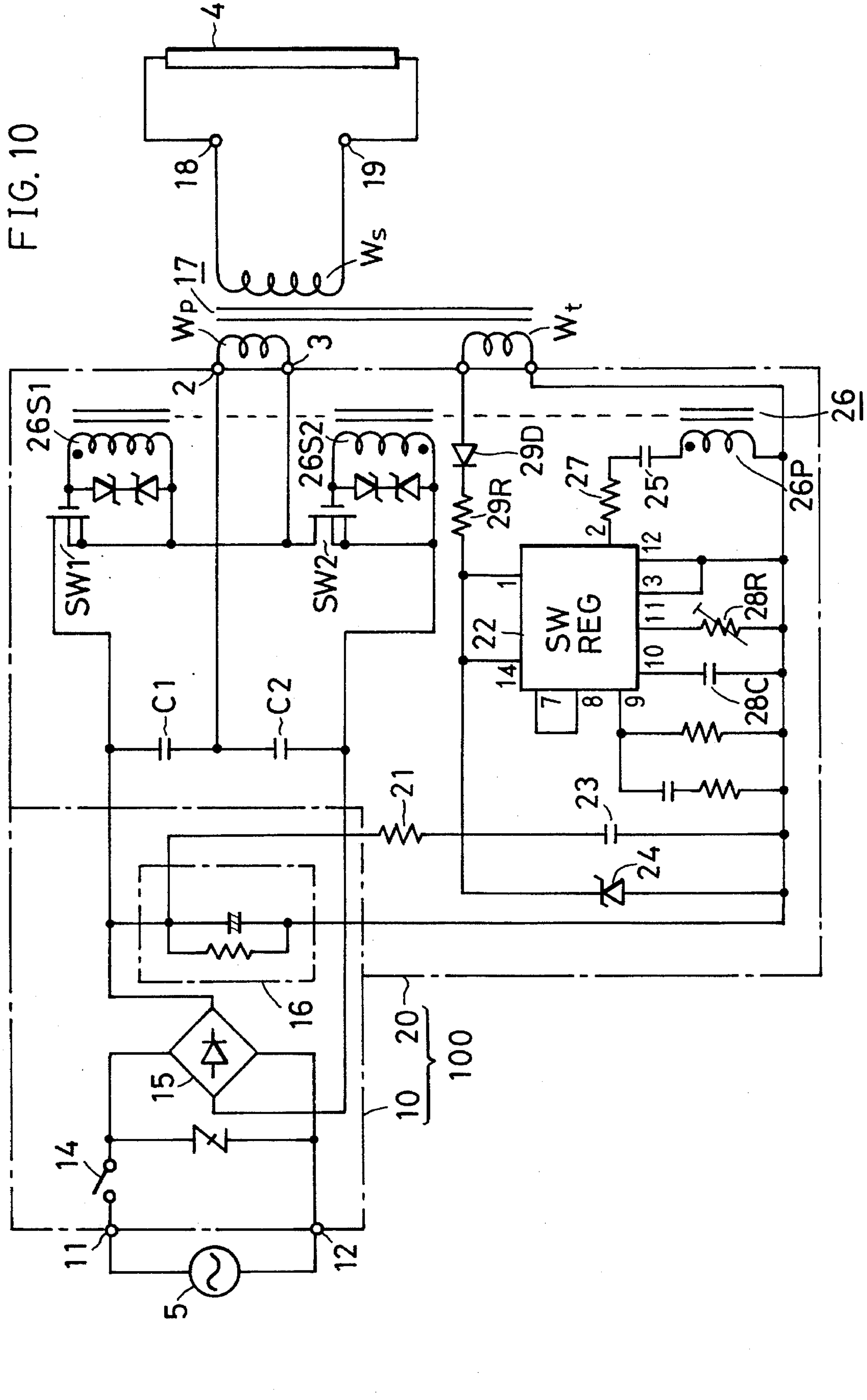
FIG. 10 is a block diagram illustrating an embodiment according to the second aspect of the invention.

FIG. 10 illustrates an embodiment of the neon tube lighting high-frequency power unit according to the second aspect of the present invention, which is adapted to preclude the possibility of introducing the so-called jelly beans in the light of the neon tube. For example, the commercial AC power supply 5 is connected between the input terminals 11 and 12, and the output AC current from the AC power supply 5 is provided, if necessary, via a switch 14, to the full-wave rectifier 15, by which it is rectified. The rectified output is smoothed by the smoothing circuit 16. That is, DC power is obtained in the smoothing circuit 16. The capacitors C1 and C2 are connected in series between both ends of the smoothing circuit 16. Further, the switching elements SW1 and SW2, each formed by an FET, are connected in series between both ends of the smoothing circuit 16. The primary winding Wp of the neon transformer 17 is connected between the connection point of the capacitors C1 and C2 and the connection point of the switching elements SW1 and SW2. The neon tube 4 is connected across the secondary winding Ws of the neon transformer 17 that is to be lighted or energized. The neon tube 4 may also be a series connection of a plurality of neon tubes of a number within a rated value.

One end of the positive side of the smoothing circuit 16 is connected to the negative side thereof via the resistor 21 and the capacitor 23. The Zener diode 24 and the switching regulator 22 for generating the rectangular high-frequency wave are connected across the capacitor 23. The switching regulator 22 may be an IC M51996 by Mitsubishi Denki K.K. of Japan. A variable resistor 28R is connected between an 11th terminal of the switching regulator 22 and the negative side (hereinafter referred to as a negative terminal) of the smoothing circuit 16, and a capacitor 28C is connected between a 10th terminal of the switching regulator 22 and the negative terminal. Moreover, the winding 26P is connected between a second terminal of the switching regulator 22 and the negative terminal via a resistor 27 and a capacitor 25. The winding 26P is coupled to the windings 26S1 and 26S2 to form the pulse transformer 26. The winding Wt is provided which is coupled to the neon transformer 17, and both ends of the winding Wt are connected to both ends of the capacitor 23 via the diode 29D and a resistor 29R. The windings 26S1 and 26S2 are connected between sources and gates of the FETs that form the switching elements SW1 and SW2, respectively.

Upon turning ON the switch 14, the DC current from the smoothing circuit 16 flows via the resistor 21 to the capacitor 23 to charge it. When the voltage across the capacitor 23 exceeds a certain value, the switching regulator 22 starts oscillation and its oscillation output is applied to the winding 26P. In consequence, the switching elements SW1 and SW2 are alternately turned ON and OFF by the rectangular pulses of the oscillation output as described previously with respect to FIG. 3. When the switching element SW1 is turned ON, charges stored in the capacitor C1 are discharged via the switching element SW1 and the winding Wp. When the switching element SW2 is turned ON, charges in the capacitor C2 are discharged via the winding Wp and the switching element SW2. In other words, current flows in the winding Wp alternately in opposite directions and a rectangular current flows therein. As the oscillation is thus started, the voltage induced in the winding Wt is rectified by the diode 29D and is charged in the capacitor 23 via the resistor 29R, by which the power voltage for the switching regulator 22 is maintained. Thus, the resistor 21 needs only to supply the capacitor 23 with only a small initial charging current for starting the switching regulator 22; therefore, the resistor 21 can be made high in resistance but small in capacity. The oscillation frequency of the switching regulator 22 is set in the range of 20 to 30 kHz, for instance.

The OFF period of the output rectangular wave depends on the product of the resistance value of the variable resistor 28R and the capacitance value of the capacitor 28C of the switching regulator 22. According to the second aspect of the invention, the OFF period is adjusted by the resistor 28R and the duty ratio of the rectangular output is shifted off 50%. The duty ratio is set chosen in the range of 45 to 48% or 52 to 55%. With the duty ratio of the rectangular wave or the ON-OFF operation of the switching elements SW1 and SW2 thus shifted off 50%, the amount of harmonic components contained in the high-frequency power to be applied to the neon tube 4 increases. This prevents generation of the jelly beans in the neon tube 4 connected across the secondary winding Ws of the neon transformer 17. In this case, since the neon tube 4 is lighted via the neon transformer 17, a sine-wave voltage, not a rectangular one, is provided to the neon tube 4. When the duty ratio is 50%, the amount of harmonic components in the high-frequency power that is applied to the neon tube 4 is so small that a standing wave is liable to be induced in the lighted neon tube 4, producing regularly-spaced-apart stripe patterns called "jelly beans" in the luminous state along the tube envelope.

The resistor 28R may also be a fixed resistor. Alternatively, it is possible to produce special lighting effects or neon display by preventing the generation of "jelly beans" or positively generating them through control of the variable resistor 28R. The resistance value of the resistor 28R need not always be continuously varied but may also be switched between two or more values. In stead of varying the resistance of the resistor 28R, the capacitance of the capacitor 28C may be switched between two capacitance values.

Figure 11:
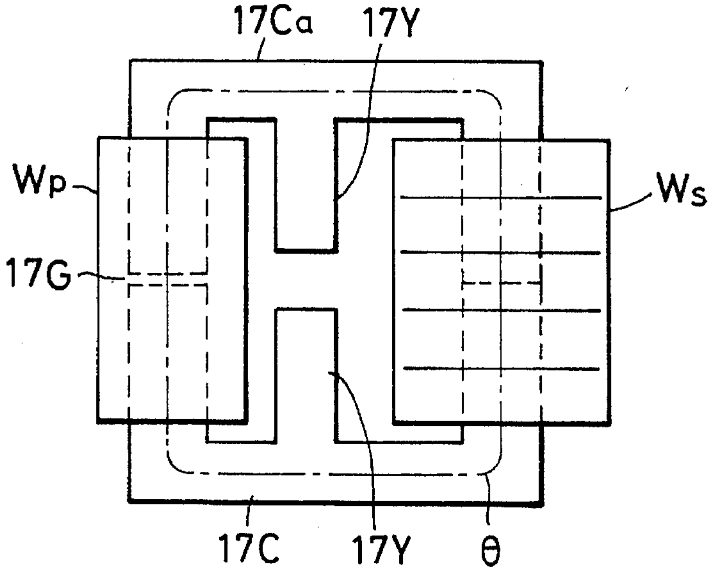
FIG. 11 is a plan view of the neon transformer.

Since the high-frequency rectangular power, whose duty ratio is shifted off 50%, is applied to the neon transformer 17, its magnetic core (or iron core) may sometimes be nonuniformly magnetized. In such an instance, the driving of the switching elements SW1 and SW2 is made unbalanced by the nonuniform magnetization, that is, only one of the switching elements is turned ON and OFF and the other left uncontrolled. Accordingly, there is the possibility of the switching elements SW1 and SW2 being broken down by a large current flowing therein which is caused by saturation. A possible solution to this problem is such a transformer structure as shown in FIG. 11, in which the neon transformer 17 has a pair of opposed E-shaped magnetic cores 17Ca and 17Cb with their legs on one side spaced a very small gap 17G apart to form a closed magnetic path θ and the primary and secondary windings Wp and Ws are wound over the legs of the both magnetic cores 17Ca and 17Cb on one and the other sides thereof, respectively. With the provision of the gaps 17G in the magnetic path θ, the magnetic cores 17Ca and 17Cb are prevented from magnetic saturation. Incidentally, the transformer 17 in this example is what is called a leakage transformer in which the leakage iron cores 17Y and 17Y are extended toward each other from the intermediate portions of the magnetic cores 17Ca and 17Cb between the primary and secondary windings Wp and Ws.

As described above, according to the second aspect of the present invention, generation of the "jelly beans" in the neon tube connected to the neon transformer can be avoided by shifting the duty ratio of the high-frequency rectangular power off 50% and supplying the power to the neon transformer.

Figure 3:
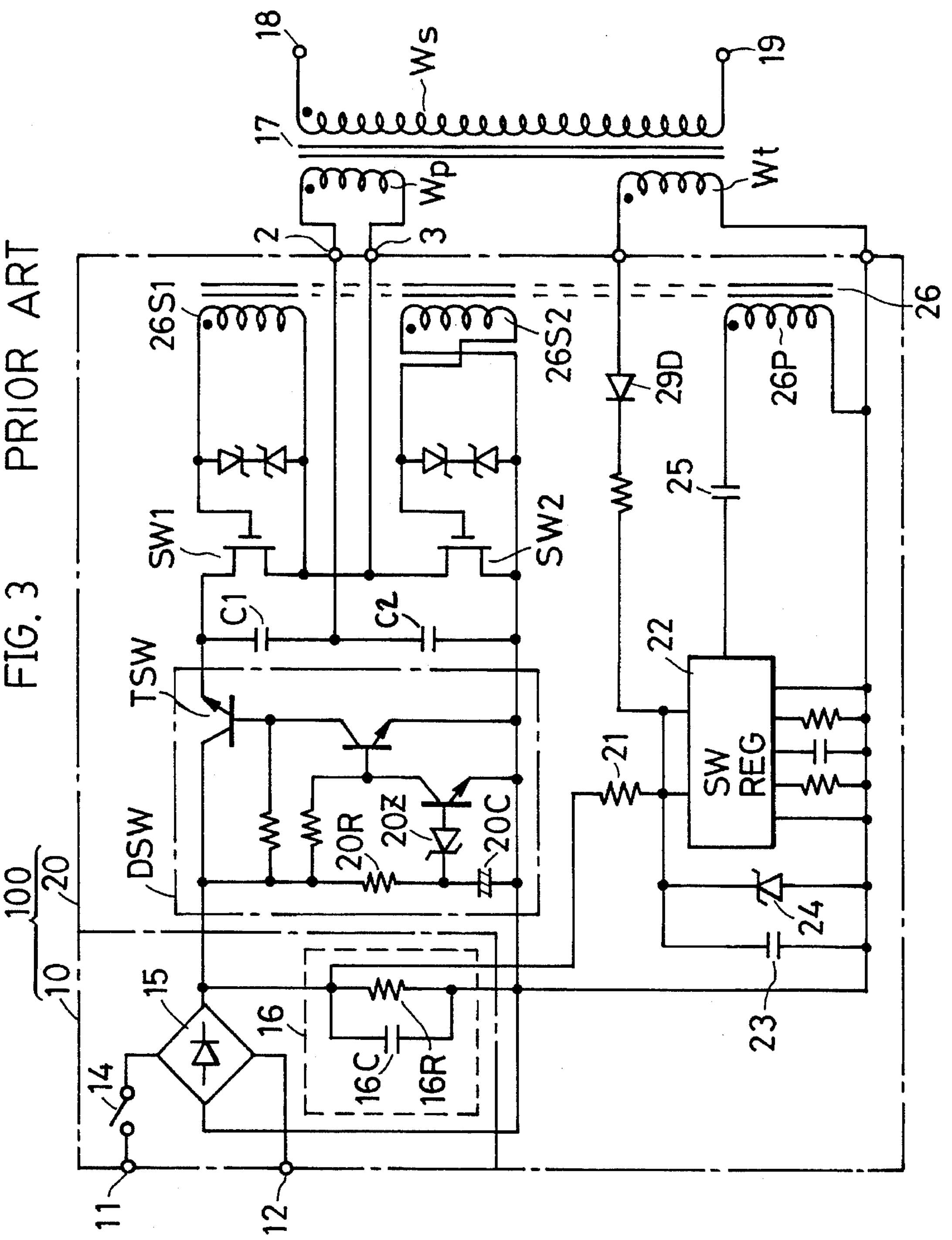
FIG. 3 PRIOR ART
FIG. 3 is a diagram showing an example of a simplified construction of a conventional half-bridge inverter.
Figure 12:
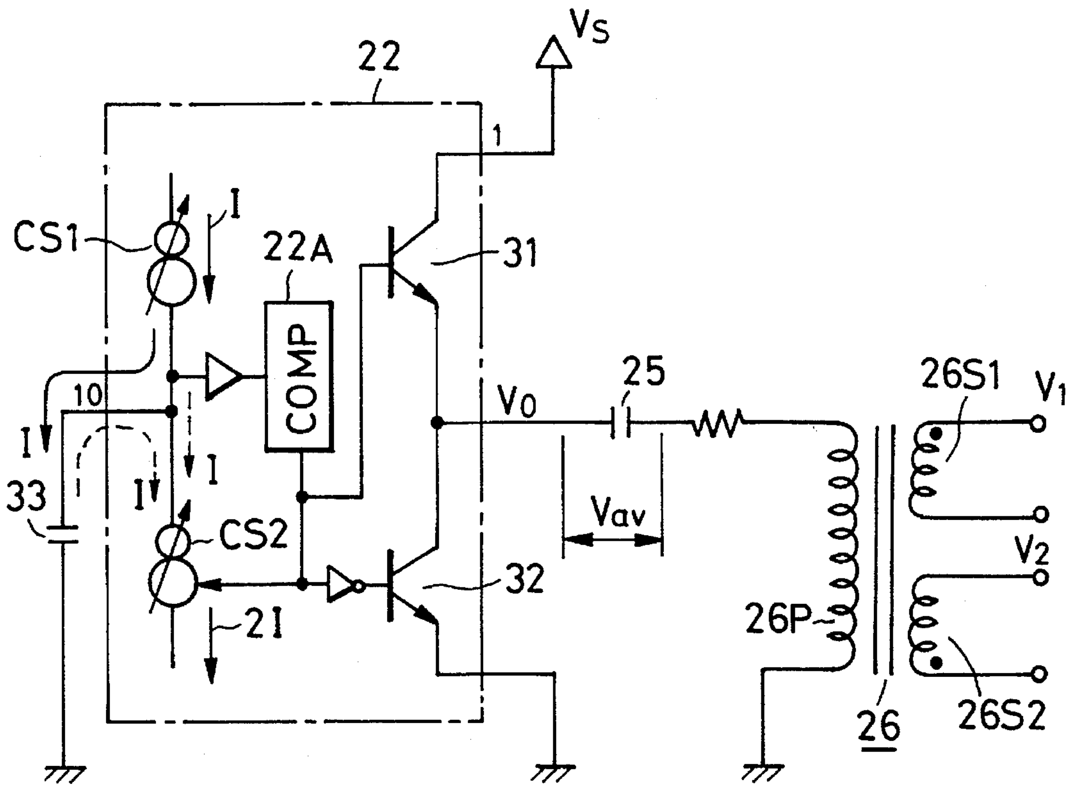
FIG. 12 PRIOR ART
FIG. 12 is a diagram showing a part of the internal configuration of the commercially available switching regulator 22 and its connection to the pulse transformer 26.

As referred to previously, the conventional neon tube lighting high-frequency power unit of FIG. 3 is defective in that the amplitude of the output drive signal from the switching regulator is unstable at the start of operation. This defect is attributable to the fact described below. FIG. 12 shows a part of the internal construction of the commercially available switching regulator 22 fabricated as an integrated circuit and its connection with the pulse transformer 26. A constant current source CS1 charges a capacitor 33 with a current I. When the voltage across the capacitor 33 exceeds a predetermined value $V_H$, it is detected by a detector 22A, and its detected output "1" is used to activate a current source CS2 to flow therefrom a current 2I. By this, the capacitor 33 is discharged, and when the voltage thereacross drops below a predetermined value $V_L$, it is detected by a comparator 22A, and its detected output "0" is used to turn OFF the constant current source CS2. By repeating the above-described operation, a rectangular oscillation output is obtained from the comparator 22A, and this oscillation output is used to alternately turn ON and OFF transistors 31, 32 connected in series between the power source Vs (a 1st terminal) and the grounding terminal. In consequence, when the transistor 31 is in the ON state, a current flows through the pulse transformer in one direction via the transistor 31, the capacitor 25 and the primary side 26P of the pulse transformer 26. When the transistor 32 is in the ON state, a current flows through the pulse transformer 26, the capacitor 25 and the transistor 32.

Figure 13:
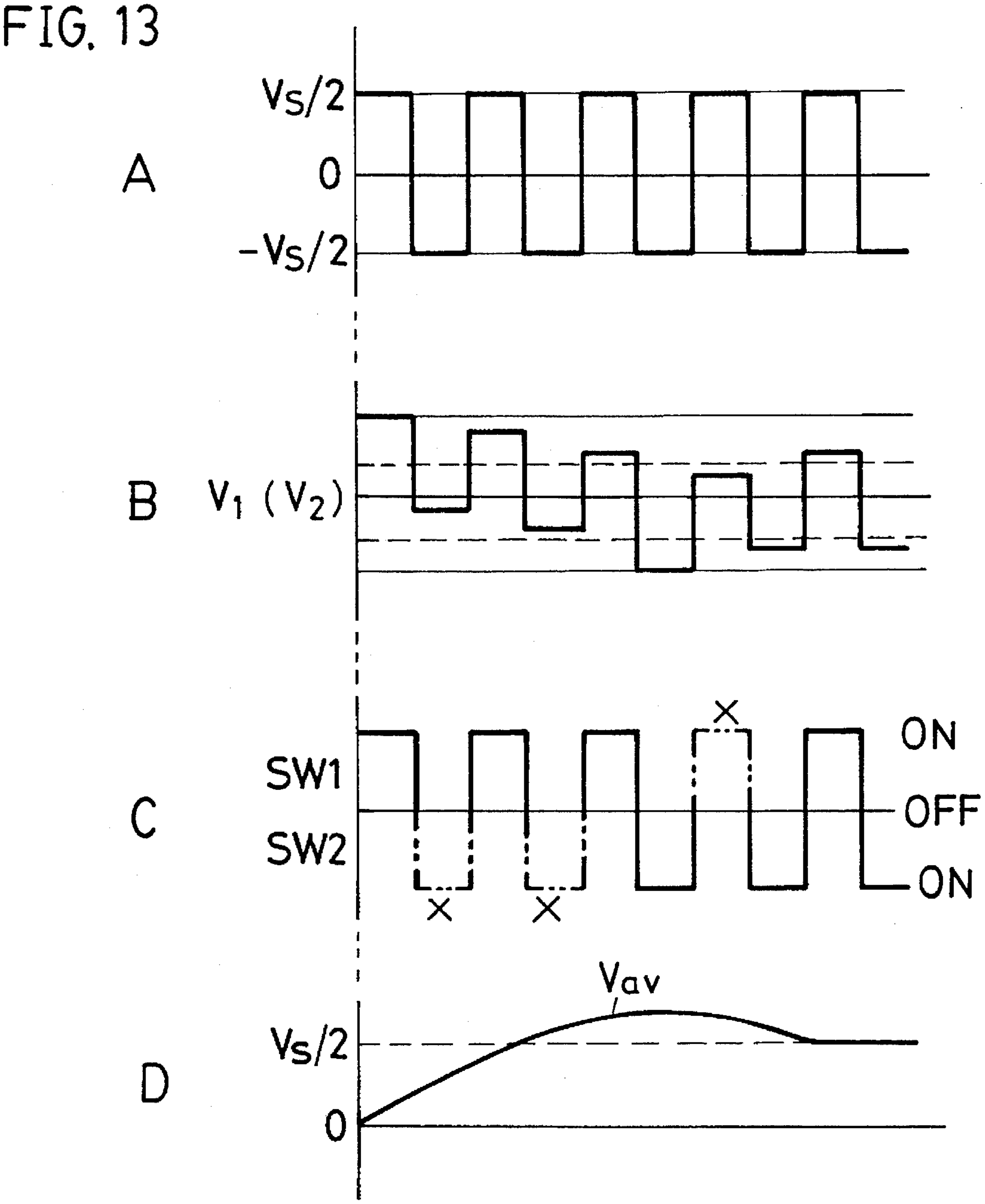
PRIOR ART FIG. 13
FIG. 13 is a waveform diagram showing the oscillation output of the switching regulator at its rise, the pulse transformer output and the voltage across the capacitor 25 in the FIG. 12 embodiment.

In this way, the current I is charged into and discharged from the capacitor 25 on an alternate basis. The ON-OFF period of the transistors 31 and 32, that is, the oscillation frequency, is determined by the capacitance of the capacitor 25, the charge/discharge current I and the preset reference voltages $V_H$ and $V_L$. In the steady state, the high-frequency power unit operates in this way and the pulse transformer 26 is supplied with positive and negative pulses of the same amplitude (±Vs/2) alternately, as shown in FIG. 13, Row A. At the start of operation, however, since the capacitor 25 has no initial charge, the charging current for the capacitor 25 also flows. That is, since the charging current to the capacitor 25 flows while being superimposed on the rectangular current, the amplitudes of voltages $V_1$ and $V_2$ that are induced in the secondary windings 26S1 and 26S2 of the pulse transformer 26 deviate in the positive or negative direction as shown in FIG. 13, Row B. That is, the charging current to the capacitor 25 flows and the average voltage $V_{av}$ across the capacitor 25 at this time varies as shown in FIG. 13, Row D; the oscillation output is superimposed on the average voltage $V_{av}$. Thus, the rectangular pulse that is provided to the pulse transformer 26 is small in amplitude and its average level is varying. On this account, in the case where the threshold voltage for driving the switching elements SW1 and SW2 is such as indicated by the broken lines in FIG. 13, Row B, the switching elements SW1 and SW2 will not be turned ON alternately with each other, as indicated by the crosses in FIG. 3, Row C. Consequently, positive and negative currents do not alternately flow into the pulse transformer 26, its iron core is nonuniformly magnetized and saturated and an excessive current flows therein, sometimes resulting in the breakdown of the FETs that form the switching elements SW1 and SW2.

Figure 14:
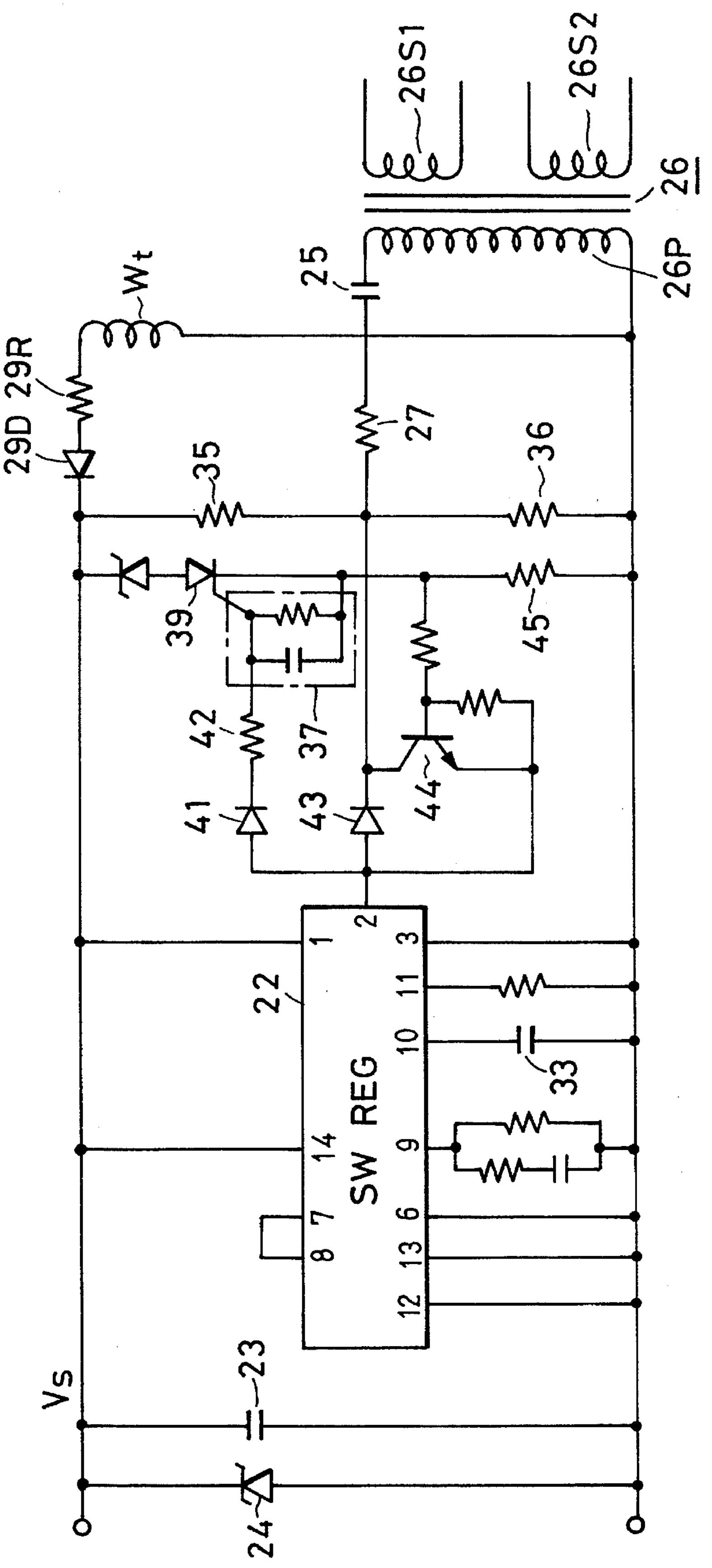
FIG. 14 is a connection diagram illustrating an embodiment according to the third aspect of the invention.

In FIG. 14 there is illustrated an embodiment of the neon tube lighting high-frequency power unit according to the third aspect of the present invention, in which the parts corresponding to those in FIGS. 10 and 12 are identified by the same reference numerals. In this case, however, only the switching regulator 22 and the associated circuits in the inverter 20 in FIG. 10 are shown. In this embodiment, a voltage divider circuit composed of resistors 35 and 36 is connected between power terminals of the switching regulator 22 (1st and 12th terminals of the IC), that is, across the capacitor 23, and the voltage dividing point is connected to a terminal of the capacitor 25 opposite from the pulse transformer 26. Thus, as the capacitor 23 is charged with voltage Vs, the capacitor 25 also is charged with voltage Vs/2, so that when the switching regulator 22 starts oscillation, the capacitor 25 has already been charged up to Vs/2. If necessary, a current limiting resistor 27 is connected in series between the connecting point of the voltage divider resistors 35, 36 and the capacitor 25.

The switching regulator 22 employed in this embodiment is one in which when the switching regulator 22 is out of oscillation, its output side is shorted to the ground. Accordingly, in this embodiment, a diode 43 is inserted between the output terminal 2 of the switching regulator 22 and the connecting point of the resistors 35, 36 so as to prevent discharging a current from the capacitor 25 into the output terminal of the switching regulator 22 during a period in which the switching regulator 22 is in a non-oscillating state. This embodiment is further provided with a transistor 44 in parallel with the diode 43 so that the parallel connection allows a current to flow through the capacitor 25 in either direction when the switching regulator 22 is in an oscillating state. That is, in this embodiment, an SCR 39 is connected across the capacitor 23 via a resistor 45, a parallel circuit 37 composed of a resistor and a capacitor is connected between the gate and cathode of the SCR 39, and a series circuit of a diode 41 and a resistor 42 is connected between the output terminal (the 2nd terminal) of the switching regulator 22 and the gate of the SCR 39. The diode 41 has its anode connected to the output side of the switching regulator 22. The diode 43 is connected between the output terminal of the switching regulator 22 and the connection point of the resistors 35 and 36, the diode 43 having its anode connected to the output terminal of the switching regulator 22. The transistor 44 is connected between the anode and cathode o the diode 43. The transistor 44 has its collector connected to the cathode of the diode 43, that is, the diode 43 and the transistor 44 are connected in reverse polarities, and the base of the transistor 44 is connected via a resistor to its emitter and to the cathode side of the SCR 39.

With such an arrangement, when the power supply is in the OFF state, the SCR 39 is in the OFF state, and consequently, the transistor 44 is also in the OFF state. When charging of the capacitor 23 is started, the capacitor 25 is charged via the resistor 35 in accordance with the voltage Vs of the capacitor 23. In this way, a voltage Vs/2 one-half the voltage Vs across the capacitor 23 is charged in the capacitor 25. When the voltage Vs across the capacitor 23 reaches a certain value, the switching regulator 22 starts oscillation, producing a rectangular waveform oscillation output having alternating levels of about Vs and 0. At this time, the capacitor 25 has been charged to Vs/2. Consequently, when the oscillation output goes high, the SCR 39 is turned ON, by which the transistor 44 is also turned ON. When the output from the switching regulator 22 exceeds Vs/2, a current flows through the diode 43, the resistor 27, the capacitor 25 and the pulse transformer 26 to the ground side; whereas when the output from the switching regulator 22 goes below Vs/2, a current flows from the ground side to the output side of the switching regulator 22 via the pulse transformer 26, the capacitor 25, resistor 27 and the transistor 44.

In the case where the output from the switching regulator 22 is a tri-state output and the impedance of the switching regulator 22 viewed from its output side in the standstill state is infinite, the SCR 39, the diode 43 and the transistor 44 can be omitted.

As described above, according to the third aspect of the invention, the capacitor that is connected in series to the pulse transformer is automatically charged prior to the start of oscillation of the switching regulator 22. Hence, even if the direct current from the smoothing circuit 16 is supplied directly to the main circuit composed of the capacitors C1, C2, the switching elements SW1, SW2, and the secondary windings 26S1, 26S2, without using the delay switch DSW (FIG. 3), switching of the switching elements SW1 and SW2 is normally started. Therefore, the main circuit can be simplified accordingly. That is, there is no need of performing troublesome operation such as delaying the turning-ON of the power supply to the main circuit by means of the delay switch DSW or gradual rising of the power voltage of the main circuit as in the prior art.

It will be apparent that many modifications and variations may be effected without departing from the scope of the novel concepts of the present invention.

What is claimed is:

1. A power unit for generating high-frequency power for energizing neon tubes or argon tubes, comprising:

inverter means for converting commercial AC power into high-frequency power;

transformer means which has a magnetic core forming a closed magnetic path and primary and secondary windings wound on said magnetic core and which is supplied at said primary winding with said high-frequency power from said inverter means and outputs high-voltage, high-frequency power to said secondary winding; and saturable reactor means which is coupled to said transformer means and whose magnetic flux density is saturated when the output voltage from said secondary winding approaches a predetermined value, thereby preventing the output voltage from said secondary winding from exceeding said predetermined value, said saturable reactor means having a leakage magnetic path provided between said primary and secondary windings of said transformer means, a secondary side magnetic path of said transformer means being magnetically saturated when the output voltage from said secondary winding becomes 1.1 to 2.0 times higher than its rated voltage.

2. The power unit of claim 1 wherein the cross-sectional area of the magnetic core of said secondary side magnetic path of said transformer means is smaller than the cross-sectional area of the magnetic core of its primary side magnetic path.

3. The power unit of claim 1, or 2 wherein the magnetic flux density of said magnetic core forming at least one part of said secondary side magnetic path of said transformer has a negative temperature coefficient in a B-H characteristic curve.

4. The power unit of claim 1, or 2 wherein a control magnetic piece is mounted on at least one part of said secondary side magnetic path.

* * * * *